(12) United States Patent
Iwasawa

(10) Patent No.: US 7,312,934 B2
(45) Date of Patent: Dec. 25, 2007

(54) ZOOM LENS AND IMAGING APPARATUS

(75) Inventor: Yoshito Iwasawa, Tokyo (JP)

(73) Assignee: Sony Corporation (JP)

( * ) Notice: Subject to any disclaimer, the term of this patent is extended or adjusted under 35 U.S.C. 154(b) by 72 days.

(21) Appl. No.: 11/206,265

(22) Filed: Aug. 18, 2005

(65) Prior Publication Data
US 2006/0056044 A1    Mar. 16, 2006

(30) Foreign Application Priority Data
Sep. 2, 2004    (JP)    ............. 2004-255565

(51) Int. Cl.
*G02B 9/60* (2006.01)
(52) U.S. Cl. .............. 359/764; 359/676; 359/763
(58) Field of Classification Search ............. 359/557, 359/676, 714, 740, 755–757, 763, 764
See application file for complete search history.

(56) References Cited

U.S. PATENT DOCUMENTS

| 5,646,779 | A | | 7/1997 | Sato | |
|---|---|---|---|---|---|
| 6,754,446 | B2 | * | 6/2004 | Hagimori et al. | ............. 396/72 |
| 7,116,489 | B2 | * | 10/2006 | Ohtake | ............. 359/687 |
| 2002/0101661 | A1 | * | 8/2002 | Harada | ............. 359/557 |
| 2004/0027685 | A1 | * | 2/2004 | Mihara et al. | ............. 359/686 |
| 2004/0070844 | A1 | * | 4/2004 | Sato | ............. 359/687 |
| 2004/0189832 | A1 | * | 9/2004 | Hagimori et al. | ............. 348/240.99 |
| 2005/0275948 | A1 | * | 12/2005 | Sueyoshi | ............. 359/676 |

FOREIGN PATENT DOCUMENTS

| EP | 0 391 533 | | 3/1990 |
|---|---|---|---|
| JP | 05-022160 | | 1/1993 |
| JP | 5-224160 | | 3/1993 |
| JP | 05-224160 | | 9/1993 |
| JP | 05224160 | A * | 9/1993 |

OTHER PUBLICATIONS

European Search Report dated Jun. 2, 2006.

* cited by examiner

*Primary Examiner*—Hung X. Dang
*Assistant Examiner*—Joseph Martinez
(74) *Attorney, Agent, or Firm*—Rader Fishman & Grauer PLLC; Ronald P. Kananen

(57) ABSTRACT

Disclosed is a zoom lens which is composed of a plurality of groups of lenses and which varies the power thereof by changing inter-group spacings. The zoom lens is configured such that: the last group of lenses that is located at the end of an image space and is negatively refractive is held stationary in optical-axis directions during variation of the power of the zoom lens, and includes a front group of negative lenses and a rear group of positive lenses; and the rear group of positive lenses or part of the rear group of positive lenses (hereinafter, referred to as a group of blur compensation lenses) is movable in directions orthogonal to the optical axis of the zoom lens. In this configuration, the group of blur compensation lenses is moved in the directions orthogonal to the optical axis in order to shift an image.

20 Claims, 9 Drawing Sheets

ZOOM LENS AND IMAGING APPARATUS

CROSS REFERENCES TO RELATED APPLICATIONS

The present invention contains subject matter related to Japanese Patent Application JP 2004-255565 filed in the Japanese Patent Office on Sep. 2, 2004, the entire contents of which are incorporated herein by reference.

BACKGROUND OF THE INVENTION

1. Field of the Invention

The present invention relates to a zoom lens having a camera-shake compensation function, that is, a function of correcting a blur in a constructed image derived from a vibration of a camera, and an imaging apparatus employing the zoom lens. More particularly, the present invention is concerned with a zoom lens that is compact enough to be preferably adopted as an imaging optical system to be included in a digital still camera, a digital video camera, or any other digital input/output equipment, that highly precisely varies a power, and that has a camera-shake compensation function, and an imaging apparatus employing the zoom lens.

2. Description of the Related Art

In recent years, a digital still camera and other types of imaging apparatuses employing a solid-state imaging device have prevailed. Higher image quality is demanded along with the prevalence of the digital still camera. In particular, the digital still camera employing an imaging device which offers a large number of pixels is requested to include an imaging lens or especially a zoom lens that enjoys perfect image formation and suits the solid-state imaging device which offers a large number of pixels.

In particular, there is an increasing demand for a camera-shake compensation function that prevents a blur in a constructed image derived from a vibration made during imaging.

In addition, the demand for a compact design is intense. A zoom lens that is especially compact in the direction of the depth thereof, that is, the incident optical-axis direction is needed.

For example, Japanese Unexamined Patent Publication (JP-A, hereinafter) No. 224160/1993 describes a zoom lens including a first group of lenses that is positively refractive, a second group of lenses that is negatively refractive, a third group of lenses that is positively refractive, a fourth group of lenses that is positively refractive, a fifth group of lenses that includes a group of positive lenses and a group of negative lenses and that is negatively refractive as a whole. In the zoom lens, a camera shake is compensated by moving the group of negative lenses, which belongs to the fifth group of lenses, in directions perpendicular to the optical axis of the zoom lens.

On the other hand, an optical system is bent by inserting a prism among lenses in attempts to downsize the optical system in an incident optical-axis direction. For example, an optical system or a zoom lens described in JP-A No. 238318/1996 has the optical axis thereof bent by disposing a prism among four groups of positive lenses, negative lenses, positive lenses, and positive lenses, and is thus downsized in the incident optical-axis direction.

SUMMARY OF THE INVENTION

The zoom lens described in the JP-A No. 22160/1993 has so many lenses that the thickness in the direction of the depth of a camera, that is, an incident optical-axis direction is not reduced even with the lenses stored. Moreover, in the zoom lens described in Patent Document 1, the fifth group of lenses including the group of blur compensation lenses is a group of movable lenses that is moved in order to vary a power. Therefore, a mechanism for driving the group of blur compensation lenses is disposed outside a mechanism for moving the group of blur compensation lenses in optical-axis directions. This leads to an increase in the size in a radial direction of the portion of the camera in which the fifth group of lenses is incorporated.

Moreover, in the zoom lens described in the JP-A No. 248318/1996, the leading lens and a reflecting member are too large to attain a compact design.

The present invention addresses the foregoing problems underlying the related arts. There is provided a zoom lens that is compact enough to be preferably adopted as an imaging optical system to be included in a digital still camera, a digital video camera, or any other digital input/output equipment, that highly precisely varies a power, and that has a camera-shake compensation function, and an imaging apparatus employing the zoom lens.

To address the foregoing problems, an embodiment of the present invention is directed to a zoom lens that includes a plurality of groups of lenses and varies the power thereof by changing inter-group spacings. The last group of lenses that is located at the end of an image space and is negatively refractive is held stationary in optical-axis directions during variation of the power of the zoom lens. Moreover, the last group of lenses includes a front group of negative lenses and a rear group of positive lenses. The rear group of positive lenses or part of the rear group of positive lenses (hereinafter, referred to as a group of blur compensation lenses) is movable in directions orthogonal to the optical axis of the zoom lens. The group of blur compensation lenses is moved in directions orthogonal to the optical axis in order to shift an image.

To address the foregoing problems, another embodiment of the present invention is directed to an imaging apparatus that includes a zoom lens that has a plurality of groups of lenses and varies the power thereof by changing inter-group spacings, and an imaging device that converts an optical image formed by the zoom lens into an electric signal. The last group of lenses that is located at the end of an image space and is negatively refractive is held stationary in optical-axis directions during variation of the power of the zoom lens. The last group of lenses includes a front group of negative lenses and a rear group of positive lenses. The rear group of positive lenses or part of the rear group of positive lenses (hereinafter, referred to as a group of blur compensation lenses) is movable in directions orthogonal to the optical axis of the zoom lens. The group of blur compensation lenses is moved in directions orthogonal to the optical axis in order to shift an image.

According to the embodiments of the present invention, there is provided a compact and high-performance zoom lens capable of compensating a camera shake. The employment of the zoom lens provides a compact and high-performance imaging apparatus capable of compensating a camera shake.

The zoom lens in accordance with the embodiment of the present invention includes a plurality of groups of lenses and varies the power thereof by changing inter-group spacings.

The last group of lenses that is located at the end of an image space and is negatively refractive is held stationary in optical-axis directions during variation of the power of the zoom lens. Moreover, the last group of lenses includes a front group of negative lenses and a rear group of positive lenses. The rear group of positive lenses or part of the rear group of positive lenses (hereinafter, referred to as a group of blur compensation lenses) is movable in directions orthogonal to the optical axis of the zoom lens. The group of blur compensation lenses is moved in directions orthogonal to the optical axis in order to shift an image.

The imaging apparatus in accordance with the embodiment of the present invention includes a zoom lens that has a plurality of groups of lenses and that varies the power thereof by changing inter-group spacings, and an imaging device that converts an optical image formed by the zoom lens into an electrical signal. Herein, the last group of lenses that is located at the end of an image space and is negatively refractive is held stationary in optical-axis directions during variation of the power of the zoom lens. Moreover, the last group of lenses includes a front group of negative lenses and a rear group of positive lenses. The rear group of positive lenses or part of the rear group of positive lenses (hereinafter, referred to as a group of blur compensation lenses) is movable in directions orthogonal to the optical axis of the zoom lens. The group of blur compensation lenses is moved in directions orthogonal to the optical axis in order to shift an image.

According to the embodiments, there is provided a compact and high-performance zoom lens capable of compensating a camera shake. Moreover, the employment of the zoom lens provides a compact and high-performance imaging apparatus capable of compensating a camera shake.

According to another embodiment of the present invention, a group of lenses located at the end of an object space is held stationary in optical-axis directions during variation of the power of the zoom lens. Moreover, a reflecting member is included for bending the optical axis substantially 90°. The imaging apparatus may be downsized in the direction of the depth thereof, that is, the incident optical-axis direction in which light is incident on the zoom lens.

According to another embodiment of the present invention, a zoom lens has a first group of lenses which is positively refractive, a second group of lenses which is negatively refractive, a third group of lenses which is positively refractive, a fourth group of lenses which is positively refractive, and a fifth group of lenses which is negatively refractive juxtaposed in that order from the end of an object space. The fourth group of lenses is moved in optical-axis directions in order to focus the zoom lens for near-distance imaging. This results in a compact design.

According to another embodiment of the present invention, assuming that CR denotes a radius of curvature whose reciprocal is the curvature of the surface of a lens included in the group of blur compensation lenses and located at the end of the object space, and Ymax denotes a maximum height of an image converged on an imaging device, the condition expressed by the following formula is satisfied:

$$0.002 < (1/CR)/Ymax < 0.05 \quad (1)$$

Consequently, a distortion or a single-sided blur occurring during camera-shake compensation can be readily compensated. Moreover, a compact design can be realized readily.

According to another embodiment of the present invention, assuming that $\beta a$ denotes a power offered by the group of blur compensation lenses, $\beta b$ denotes a power offered by a group of lenses located more closely to an image plane than the group of blur compensation lenses is, the condition expressed by the following formula is satisfied:

$$0.5 < (1-\beta a) \times \beta b < 1.2 \quad (2)$$

Consequently, a camera shake can be compensated without the necessity of high precision merely by shifting the group of blur compensation lenses by a small magnitude.

BRIEF DESCRIPTION OF THE DRAWINGS

Embodiments of the present invention will be described in detail based on the following figures, wherein.

DESCRIPTION OF THE PREFERRED EMBODIMENTS

Referring to the appended drawings, embodiments of a zoom lens and an imaging apparatus in accordance with the present invention will be described below.

Figure 1:
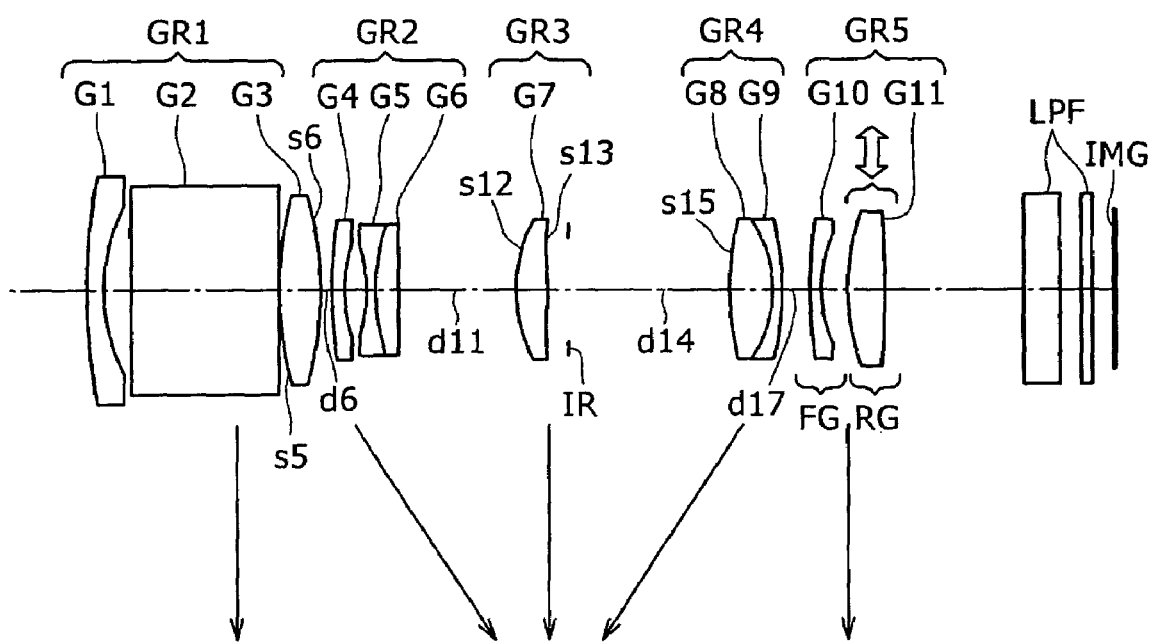
FIG. 1 schematically shows the arrangement of lenses in a first embodiment of a zoom lens in accordance with the present invention.
Figure 5:
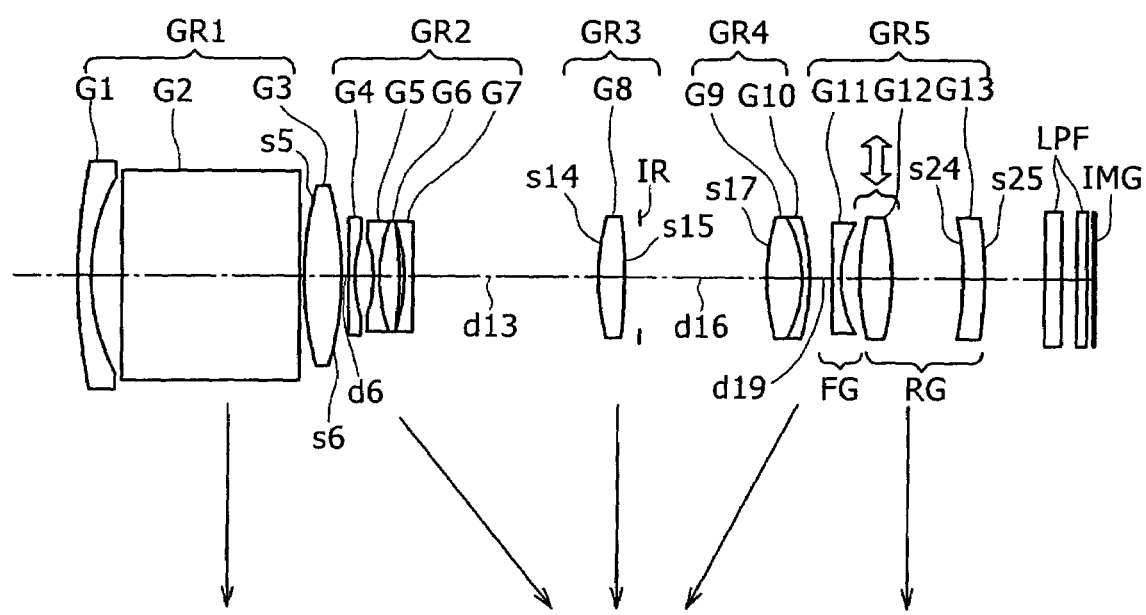
FIG. 5 schematically shows the arrangement of lenses in a second embodiment of a zoom lens in accordance with the present invention.
Figure 9:
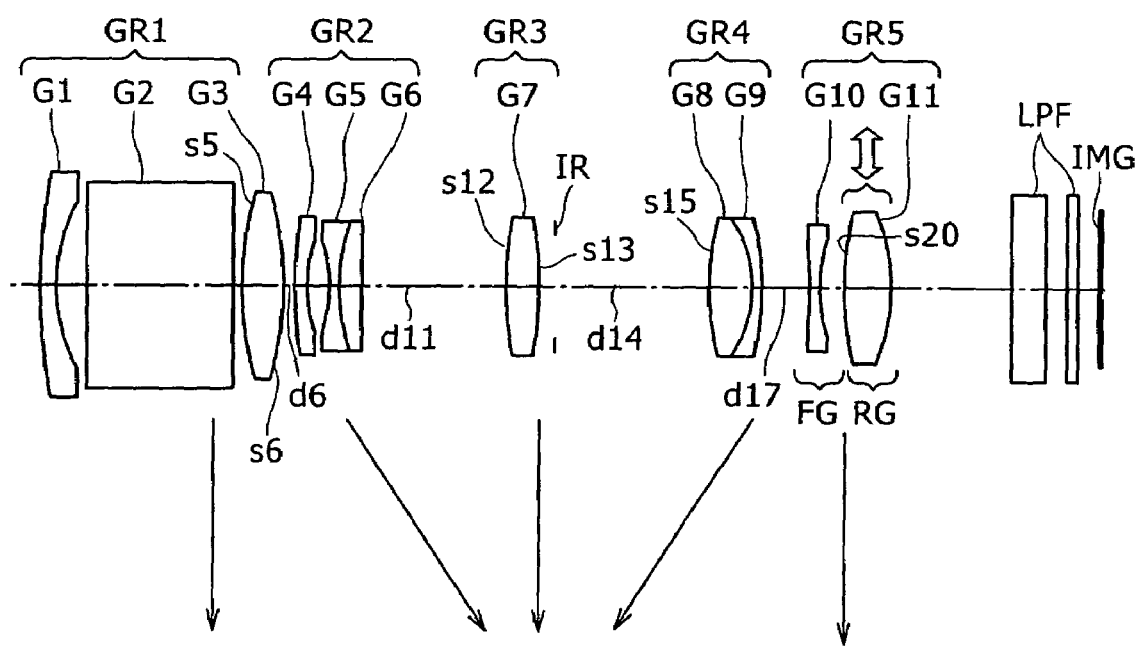
FIG. 9 schematically shows the arrangement of lenses in a third embodiment of a zoom lens in accordance with the present invention.

As shown in |FIG. 1|, FIG. 5, and FIG. 9, a zoom lens in accordance with an embodiment of the present invention has a first group of lenses GR1 which is positively refractive, a second group of lenses GR2 which is negatively refractive, a third group of lenses GR3 which is positively refractive, a fourth group of lenses GR4 which is positively refractive, and a fifth group of lenses which is negatively refractive juxtaposed in that order from the end of an object space. The first group of lenses GR1, the third group of lenses GR3, and the fifth group of lenses GR5 are held stationary during variation of the power of the zoom lens. The second group of lenses GR2 is mainly moved in optical-axis directions in order to vary a power. The fourth group of lenses GR4 is moved in the optical-axis directions in order to compensate a displacement of an image plane occurring during variation of the power of the zoom lens or focus the zoom lens for near-distance imaging.

Moreover, the fifth group of lenses GR5 includes a front group of lenses FG that is negatively refractive and a rear group of lenses RG that is positively refractive. The rear group of lenses RG that is positively refractive or part of the rear group of lenses RG (hereinafter, referred to as a group of blur compensation lenses) is moved in directions orthogonal to the optical axis in order to shift an image.

In the zoom lens in accordance with the embodiment of the present invention, the fifth group of lenses GR5 that is the last group of lenses includes the front group of lenses FG that is negatively refractive and the rear group of lenses RG that is positively refractive. Consequently, the front group of lenses FG pops light up and the rear group of lenses RG provides light analogous to light having passed through a telecentric system. Consequently, the first group of lenses GR1 or especially the leading lens G1 that is included in the first group of lenses and located at the end of an object space has the diameter thereof reduced. Eventually, the zoom lens becomes compact as a whole.

Moreover, since the group of blur compensation lenses is disposed as a trailing group of lenses, a compact design and a reduced number of lenses are attained. In other words, since the group of blur compensation lenses is disposed as a trailing group of lenses, the group of blur compensation lenses will not interfere with a group of movable lenses (for example, the second group of lenses GR2 or the fourth group of lenses GR4). The disposition of a mechanism for driving the group of blur compensation lenses will not increase the outer diameter of the zoom lens. When the groups of lenses are moved in directions orthogonal to the optical axis in order to compensate a camera shake, aberrations or especially a distortion takes place. In order to compensate the aberrations or distortion, the number of lenses cannot help being increased. In the zoom lens in accordance with the present invention, a group of lenses that provides light analogous to light having passed through a telecentric system is moved in directions orthogonal to the optical axis in order to compensate a camera shake. Aberrations are therefore limited. Moreover, high optical performance can be maintained without an increase in the number of lenses.

Preferably, in the zoom lens according to the embodiment of the present invention, a reflecting member for bending the optical axis of the zoom lens nearly 90° is included in the first group of lenses GR1 that is a group of stationary lenses. This leads to a decrease in the size of the zoom lens in an incident optical-axis direction (a direction of the optical axis of a lens located at the end of an object space). Eventually, the depth of an imaging apparatus such as a digital still camera can be reduced, that is, the imaging apparatus can be thinned.

Moreover, preferably, the zoom lens in accordance with the embodiment of the present invention satisfies the condition expressed by the following formula (1):

$$0.002 < (1/CR)/Y\max < 0.05 \qquad (2)$$

where CR denotes a radius of curvature whose reciprocal is the curvature of the surface of the lens located at the object space-side end of the group of blur compensation lenses, and Ymax denotes the maximum height of an image converged on an imaging device.

The formula (1) limits the radius of curvature, the reciprocal of which is the curvature of the surface of the lens located at the object space-side end of the group of blur compensation lenses, to a specific range. If the numerical value of an expression (1/CR)/Ymax falls below a lower limit specified in the formula (1), that is, if the radius of curvature whose reciprocal is the curvature of the surface of the lens located at the object space-side end of the group of blur compensation lenses falls below a value inferred from the formula (1), it is difficult to make the optical system compact. If the numerical value of the expression (1/CR)/Ymax exceeds an upper limit specified in the formula (1), that is, if the radius of curvature whose reciprocal is the curvature of the surface of the lens located at the object space-side end of the group of blur compensation lenses exceeds a value inferred from the formula (1), it is difficult to compensate a distortion or a single-sided blur occurring during compensation of a camera shake.

Furthermore, preferably, the zoom lens in accordance with the embodiment of the present invention satisfies the condition expressed by the following formula (2):

$$0.5 < (1-\beta a) \times \beta b < 1.2$$

where βa denotes a power offered by the group of blur compensation lenses, and βb denotes a power offered by a group of lenses located more closely to an image plane than the group of blur compensation lenses is.

The formula (2) limits a ratio of a magnitude of a shift made by an image to a magnitude of movement made by the group of blur compensation lenses to a specific range. If the numerical value of an expression (1−βa)×βb falls below a lower limit specified in the formula (2), the magnitude of movement made by the group of blur compensation lenses that causes an image to shift increases. This leads to an increase in the size of a driving system and hinders realization of a compact design. If the numerical value of the expression (1−βa)×βb exceeds an upper limit specified in the formula (2), although the group of blur compensation lenses inches, an image shifts largely. This leads to a demand for highly-precise control. Eventually, it becomes necessary to manufacture or assemble parts precisely and to control a detecting system and a driving system highly precisely. This results in a very expensive zoom lens.

As mentioned above, when a prism is adopted as the reflecting member for bending the optical axis, a glass material exhibiting a high refractive index is preferably adopted. Consequently, the reflecting member is downsized. This is advantageous in realizing a compact zoom lens.

More preferably, for realization of a compact design, ND filter or a liquid-crystal light adjustment device is employed instead of changing the diameter of an aperture stop so as to adjust an amount of light.

More preferably, electric signal processing is performed in order to compensate a color mismatch occurring during compensation of a camera shake. Consequently, a load imposed on lenses during compensation of a chromatic aberration is lightened, and the number of lenses is reduced. Further, becomes easy to design lenses.

Referring to FIG. 1 to FIG. 12 and Table 1 to Table 10, zoom lenses in accordance with embodiments of the present invention and numerical examples will be described below.

Symbols employed in the numerical examples have the meanings described below.

Namely, ω denotes a half angle of view, si denotes the i-th surface from the surface located at the end of an object space, ri denotes a radius of curvature whose reciprocal is the curvature of the surface si, di denotes a spacing between the i-th surface from the surface located at the end of the object space and the i+1-th surface, ni denotes a refractive index by which the i-th lens affects a spectral line d (wavelength of 587.6 nm), and vi denotes an Abbe number by which the i-th lens affects the spectral line d (wavelength of 587.6 nm). Moreover, the shape of an aspheric surface is defined by the following formula 1:

$$x = \frac{y^2 \cdot c^2}{1 + (1 - \varepsilon \cdot y^2 \cdot c^2)^{1/2}} + \Sigma A^i \cdot Y^i \quad \text{Formula 1}$$

Herein, x denotes a distance in an optical-axis direction from the vertex of a lens, y denotes a height in a direction perpendicular to the optical axis, c denotes the paraxial curvature of a lens at the vertex of the lens, $\varepsilon$ denotes a conical constant, and $A^i$ denotes an i-th-order aspherical coefficient.

FIG. 1 shows the arrangement of lenses included in a zoom lens in accordance with a first embodiment of the present invention. According to the first embodiment, the zoom lens has a first group of lenses GR1 which is positively refractive, a second group of lenses GR2 which is negatively refractive, a third group of lenses GR3 which is positively refractive, a fourth group of lenses GR4 which is positively refractive, and a fifth group of lenses GR5 which is negatively refractive juxtaposed in that order from the end of an object space. The first group of lenses GR1 includes a negative lens G1, a rectangular prism G2 that bends the optical axis of the zoom lens 90°, and a positive lens G3 whose surfaces are aspheric surfaces. The second ground of lenses GR2 includes a negative lens G4 and a compound lens made up of a negative lens G5 and a positive lens G6. The third group of lenses GR3 is realized with a positive lens G7 whose surfaces are aspheric surfaces. The fourth group of lenses GR4 is realized with a compound lens made up of a positive lens G8 and a negative lens G9. The fifth group of lenses includes a front group of lenses FG realized with a negative lens G10 and a rear group of lenses RG realized with a positive lens G11. The rear group of lenses GR (group of blur compensation lenses) is moved in directions perpendicular to the optical axis in order to shift an image.

Moreover, the first group of lenses GR1, the third group of lenses GR3, and the fifth group of lenses GR5 are held stationary during variation of the power of the zoom lens. The second group of lenses GR2 is mainly moved in optical-axis directions in order to vary a power. The fourth group of lenses GR4 is moved in the optical-axis directions in order to compensate a displacement of an image plane occurring during variation of the power of the zoom lens or to focus the zoom lens for near-distance imaging.

In FIG. 1, LPF denotes a low-pass filter interposed between the fifth group of lenses GR5 and the image plane IMG. Moreover, an aperture stop IR is disposed near the image plane-side end of the third group of lenses GR3 and held stationary during variation of the power of the zoom lens.

Table 1 lists numerical values concerning optical elements, which are concrete values adapted to the first embodiment, as part of the first numerical example. In the table, ASP signifies that the surface concerned is an aspheric surface, and INFINITY signifies that the surface concerned is a plane.

TABLE 1

| si | ri | di | ni | vi |
|---|---|---|---|---|
| 1 | r1 = 37.313 | d1 = 0.650 | n1 = 1.92286 | v1 = 20.884 |
| 2 | r2 = 8.648 | d2 = 1.380 | | |
| 3 | r3 = INFINITY | d3 = 6.900 | n2 = 1.83500 | v2 = 42.984 |
| 4 | r4 = INFINITY | d4 = 0.200 | | |
| 5 | r5 = 11.744(ASP) | d5 = 1.988 | n3 = 1.76802 | v3 = 49.300 |
| 6 | r6 = −18.325(ASP) | d6 = variable | | |
| 7 | r7 = 24.918 | d7 = 0.500 | n4 = 1.88300 | v4 = 40.805 |
| 8 | r8 = 6.216 | d8 = 1.048 | | |
| 9 | r9 = −7.984 | d9 = 0.500 | n5 = 1.80420 | v5 = 46.503 |
| 10 | r10 = 8.715 | d10 = 1.049 | n6 = 1.92286 | v6 = 20.884 |
| 11 | r11 = 60.123 | d11 = variable | | |
| 12 | r12 = 10.486(ASP) | d12 = 1.488 | n7 = 1.77377 | v7 = 47.200 |
| 13 | r13 = −37.305(ASP) | d13 = 0.960 | | |
| 14 | r14 = INFINITY | d14 = variable | | Aperture stop |
| 15 | r15 = 13.0477(ASP) | d15 = 2.086 | n8 = 1.66672 | v8 = 48.297 |
| 16 | r16 = −5.584 | d16 = 0.500 | n9 = 1.90366 | v9 = 31.310 |
| 17 | r17 = −12.676 | d17 = variable | | |
| 18 | r18 = 34.016 | d18 = 0.500 | n10 = 1.84666 | v = 10 = 23.785 |
| 19 | r19 = 6.234 | d19 = 1.187 | | |
| 20 | r20 = 10.281 | d20 = 1.785 | n11 = 1.48749 | v11 = 70.441 |
| 21 | r21 = −37.764 | d21 = 6.641 | | |
| 22 | r22 = INFINITY | d22 = 1.600 | n12 = 1.51680 | v12 = 64.198 |
| 23 | r23 = INFINITY | d23 = 1.065 | | |
| 24 | r24 = INFINITY | d24 = 0.500 | n13 = 1.51680 | v13 = 64.198 |
| 25 | r25 = INFINITY | | | |

According to the first embodiment, an inter-surface spacing d6 between the first group of lenses GR1 and the second group of lenses GR2, an inter-surface spacing d11 between the second group of lenses GR2 and the third group of lenses GR3, an inter-surface spacing d14 between the aperture stop IR and the fourth group of lenses GR4, and an inter-surface spacing d17 between the fourth group of lenses GR4 and the fifth group of lenses GR5 are variable for the variation of a power. Table 2 lists as part of the first numerical example the values of the inter-surface spacings d6, d11, d14, and d17 adapted to the first embodiment together with focal lengths, f-numbers, and half angles of views ω, wherein the numerical values are measured with the groups of lenses moved to their wide-angle positions, their intermediate focal points located between their wide-angle positions and their telephoto positions, and their telephoto positions.

TABLE

| Focal length | 6.52 | 10.95 | 18.54 |
|---|---|---|---|
| f-number | 3.60 | 3.88 | 4.63 |
| ω (degree) | 30.54 | 18.29 | 10.86 |
| d6 | 0.500 | 3.544 | 5.564 |
| d11 | 5.564 | 2.520 | 0.500 |
| d14 | 7.525 | 4.851 | 1.882 |
| d17 | 1.300 | 3.974 | 6.943 |

According to the first embodiment, the surfaces s5 and s6 of the second lens G3 included in the first group of lenses GR1, the surfaces s12 and s13 of the positive lens G7 included in the third group of lenses GR3, and the object space-side surface s15 of the compound lens realizing the fourth group of lenses GR4 are aspheric surfaces.

Table 3 lists as part of the first numerical example the fourth-order, sixth-order, eighth-order, and tenth-order aspherical coefficients for the surfaces s5, s6, s12, s13, and s15 together with conical constants $\epsilon$.

TABLE 3

| si | $\epsilon$ | $A^4$ | $A^6$ | $A^8$ | $A^{10}$ |
|---|---|---|---|---|---|
| 5 | 1 | $-0.128629 \times 10^{-3}$ | $-0.682694 \times 10^{-5}$ | $0.467326 \times 10^{-6}$ | $-0.321073 \times 10^{-7}$ |
| 6 | 1 | $-0.262565 \times 10^{-4}$ | $-0.376614 \times 10^{-5}$ | $0.217917 \times 10^{-6}$ | $-0.236060 \times 10^{-7}$ |
| 12 | 1 | $0.628194 \times 10^{-3}$ | $0.297806 \times 10^{-4}$ | $0.294596 \times 10^{-5}$ | $0.847943 \times 10^{-7}$ |
| 13 | 1 | $0.944369 \times 10^{-3}$ | $0.454797 \times 10^{-4}$ | $0.140106 \times 10^{-5}$ | $0.321119 \times 10^{-6}$ |
| 15 | 1 | $-0.603083 \times 10^{-4}$ | $0.427956 \times 10^{-5}$ | $-0.117877 \times 10^{-6}$ | $0.644946 \times 10^{-8}$ |

Figure 2:
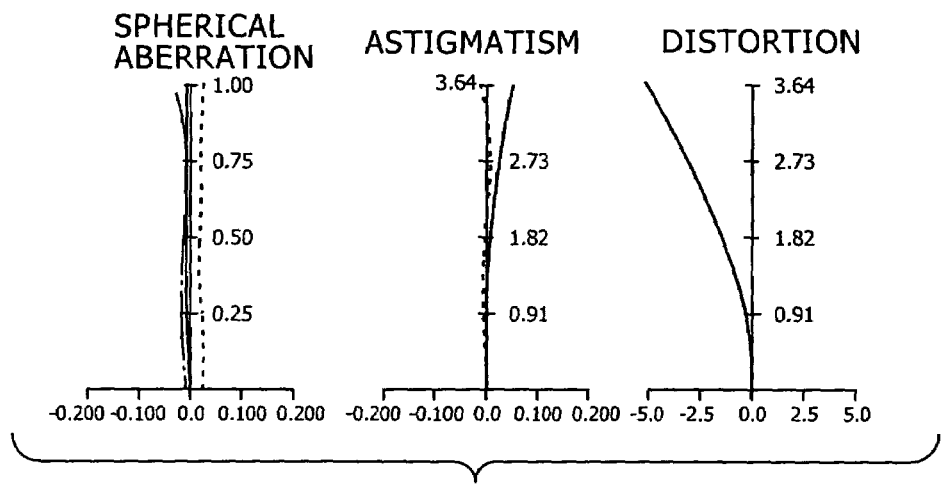
FIG. 2 graphically shows spherical aberrations, astigmatisms, and a distortion occurring with groups of lenses moved to their wide-angle positions in a first embodiment of a zoom lens in accordance with the present invention.

FIG. 2 graphically shows aberrations, which occur with the groups of lenses moved to their wide-angle positions, on the basis of the first numerical example.

Figure 3:
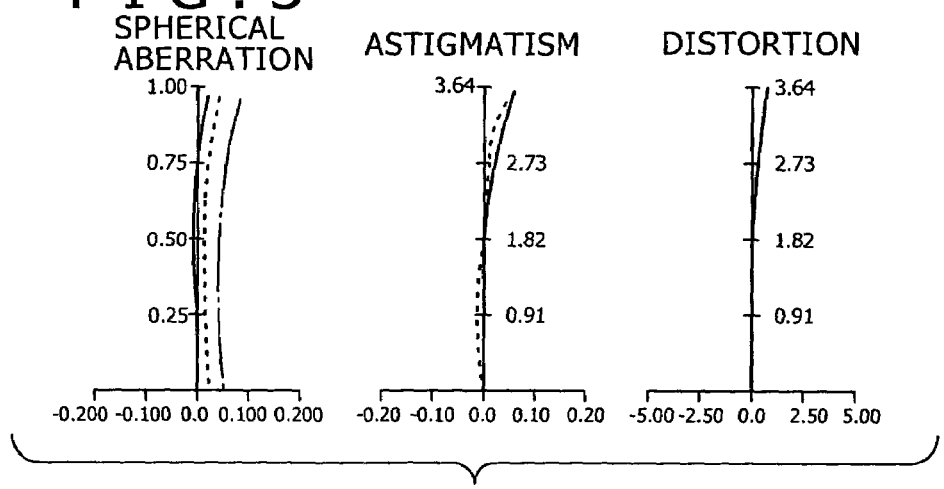
FIG. 3 graphically shows spherical aberrations, astigmatisms, and a distortion occurring with the groups of lenses moved to their intermediate focal points between their wide-angle positions and their telephoto positions in a first embodiment of a zoom lens in accordance with the present invention.

FIG. 3 graphically shows the aberrations, which occur with the groups of lenses moved to their intermediate focal points between their wide-angle positions and their telephoto positions, on the basis of the first numerical example.

Figure 4:
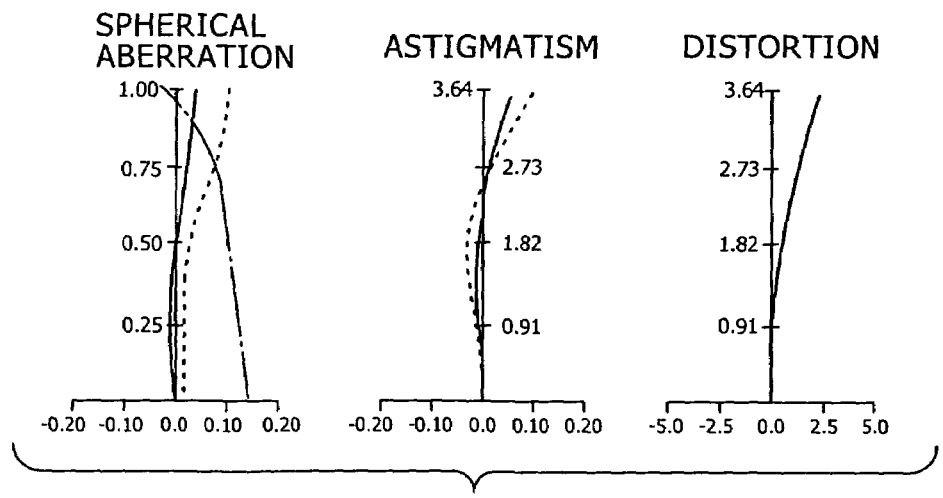
FIG. 4 graphically shows spherical aberrations, astigmatisms, and a distortion occurring with the groups of lenses moved to their telephoto positions in a first embodiment of a zoom lens in accordance with the present invention.

FIG. 4 graphically shows the aberrations, which occur with the groups of lenses moved to their telephoto positions, on the basis of the first numerical example.

In the drawings graphically showing aberrations, spherical aberrations dependent on spectral lines d, C, and g respectively are indicated with a solid line, a dashed line, and a dot-dash line respectively with the axis of ordinates graduated in ratios to f-numbers measured with the aperture stop held open and with the axis of abscissas graduated in degrees of defocus. Astigmatisms occurring on a sagittal plane and a meridional plane respectively are indicated with a solid line and a dashed line respectively with the axis of ordinates graduated in image heights and the axis of abscissas graduated in focal lengths. A distortion is indicated with the axis of ordinates graduated in image heights and the axis of abscissas graduated in percentages.

FIG. 5 shows the arrangement of lenses included in a zoom lens in accordance with a second embodiment of the present invention. According to the second embodiment, the zoom lens has a first group of lenses GR1 which is positively refractive, a second group of lenses GR2 which is negatively refractive, a third group of lenses GR3 which is positively refractive, a fourth group of lenses GR4 which is positively refractive, and a fifth group of lenses which is negatively refractive juxtaposed in that order from the end of an object space. The first group of lenses GR1 includes a negative lens G1, a rectangular prism G2 that bends the optical axis of the zoom lens 90°, and a positive lens G3 whose surfaces are aspheric surfaces. The second group of lenses GR2 includes a negative lens G4, a compound lens made up of a negative lens G5 and a positive lens G6, and a negative lens G7. The third group of lenses G3 is realized with a positive lens G8 whose surfaces are aspheric surfaces. The fourth group of lenses GR4 is realized with a compound lens made up of a positive lens |G9| whose object plane side has an aspheric surface and a negative lens |G10|. The fifth group of lenses GR5 includes a front group of lenses FG realized with a negative lens G11 and a rear group of lenses RG including a positive lens G12 and a negative lens G13 whose surfaces are aspheric surfaces. A positive lens G12 (group of blue compensation lenses) that is part of the rear group of lenses RG is moved in directions perpendicular to the optical axis in order to shift an image.

Moreover, the first group of lenses GR1, the third group of lenses GR3, and the fifth group of lenses GR5 are held stationary during variation of the power of the zoom lens. The second group of lenses GR2 is mainly moved in optical-axis directions in order to vary a power. The fourth group of lenses GR4 is moved in the optical-axis directions in order to compensate a displacement of an image plane occurring during variation of the power of the zoom lens or focus the zoom lens for near-distance imaging.

In FIG. 5, LPF denotes a low-pass filter interposed between the fifth group of lenses GR5 and the image plane IMG. Moreover, an aperture stop IR is disposed near the image-plane side of the third group of lenses GR3 and held stationary during variation of the power of the zoom lens.

Table 4 lists numerical values concerning optical elements as part a second numerical example, wherein the numerical values are concrete values adapted to the second embodiment.

TABLE 4

| si | ri | di | ni | vi |
|---|---|---|---|---|
| 1 | r1 = 40.301 | d1 = 0.650 | n1 = 1.92286 | v1 = 20.884 |
| 2 | r2 = 14.578 | d2 = 1.900 | | |
| 3 | r3 = INFINITY | d3 = 11.560 | n2 = 1.90366 | v2 = 31.310 |
| 4 | r4 = INFINITY | d4 = 0.200 | | |
| 5 | r5 = 15.443(ASP) | d5 = 2.238 | n3 = 1.69350 | v3 = 53.201 |
| 6 | r6 = −32.170(ASP) | d6 = variable | | |
| 7 | r7 = 111.075 | d7 = 0.500 | n4 = 1.88300 | v4 = 40.805 |
| 8 | r8 = 8.671 | d8 = 0.992 | | |
| 9 | r9 = −35.625 | d9 = 0.450 | n5 = 1.78590 | v5 = 43.934 |
| 10 | r10 = 9.866 | d10 = 1.199 | n6 = 1.92286 | v6 = 20.884 |
| 11 | r11 = −103.576 | d11 = 0.350 | | |
| 12 | r12 = −16.275 | d12 = 0.500 | n7 = 1.83500 | v7 = 42.984 |
| 13 | r13 = 80.452 | d13 = variable | | |

TABLE 4-continued

| si | ri | di | ni | vi |
|---|---|---|---|---|
| 14 | r14 = 12.814(ASP) | d14 = 1.596 | n8 = 1.58313 | v8 = 59.461 |
| 15 | r15 = −29.038(ASP) | d15 = 0.920 | | |
| 16 | r16 = INFINITY | d16 = variable | | Aperture stop |
| 17 | r17 = 11.931(ASP) | d17 = 2.270 | n9 = 1.58313 | v9 = 59.461 |
| 18 | r18 = −8.265 | d18 = 0.450 | n10 = 1.80518 | v10 = 25.456 |

TABLE 4-continued

| si | ri | di | ni | vi |
|---|---|---|---|---|
| 19 | r19 = −14.682 | d19 = variable | | |
| 20 | r20 = 82.821 | d20 = 0.500 | n11 = 1.90366 | v11 = 31.310 |
| 21 | r21 = 7.401 | d21 = 1.100 | | |
| 22 | r22 = 13.175 | d22 = 1.956 | n12 = 1.48749 | v12 = 70.441 |
| 23 | r23 = −20.450 | d23 = 4.531 | | |
| 24 | r24 = 17.210(ASP) | d24 = 1.300 | n13 = 1.52470 | v13 = 56.236 |
| 25 | r25 = −25.625(ASP) | d25 = 3.919 | | |
| 26 | r26 = INFINITY | d26 = 0.830 | n14 = 1.51680 | v14 = 64.198 |
| 27 | r27 = INFINITY | d27 = 1.120 | | |
| 28 | r28 = INFINITY | d28 = 0.500 | n15 = 1.51680 | v15 = 64.198 |
| 29 | r29 = INFINITY | | | |

According to the second embodiment, an inter-surface spacing d6 between the first group of lenses GR1 and the second group of lenses GR2, an inter-surface distance d13 between the second group of lenses GR2 and the third group of lenses GR3, an inter-surface distance d16 between the aperture stop IR and the fourth group of lenses Gr, and an inter-surface distance d19 between the fourth group of lenses GR4 and the fifth group of lenses GR5 are variable for variation of a power. Table 5 lists as part of the second numerical example the values of the inter-surface spacings d6, d13, d16, and d19 together with focal lengths, f-numbers, and half angles of view ω, wherein the values of the inter-surface spacings are measured with the groups of lenses moved to their wide-angle positions, their intermediate focal points between their wide-angle positions and their telephoto positions, and their telephoto positions.

TABLE 5

| Focal length | 6.88 | 12.72 | 33.01 |
|---|---|---|---|
| f-number | 3.60 | 3.79 | 4.53 |
| ω (degree) | 30.06 | 16.36 | 6.39 |
| d6 | 0.600 | 6.177 | 11.895 |
| d13 | 11.865 | 6.288 | 0.570 |
| d16 | 8.214 | 5.922 | 2.108 |
| d19 | 1.500 | 3.792 | 7.606 |

According to the second embodiment, the surfaces s5 and s6 of the second lens G3 included in the first group of lenses GR1, the surfaces s14 and s15 of a positive lens G7 included in the third group of lenses GR3, the object space-side surface s17 of the compound lens realizing the fourth group of lenses GR4, and the surfaces s24 and s25 of the image space-side lens G13 included in the rear group of lenses RG belonging to the fifth group of lenses GR5 are aspheric surfaces. Table 6 lists as part of the second numerical example the fourth-order, sixth-order, eight-order, and tenth-order aspherical coefficients for the surfaces s5, s6, s14, s15, s17, s24, and s25 together with conical constants ϵ.

TABLE 6

| si | ϵ | $A^4$ | $A^6$ | $A^8$ | $A^{10}$ |
|---|---|---|---|---|---|
| 5  | 1 | $-0.500951 \times 10^{-4}$ | $0.869291 \times 10^{-6}$  | $-0.298634 \times 10^{-7}$ | $0.716678 \times 10^{-9}$ |
| 6  | 1 | $-0.712971 \times 10^{-5}$ | $0.954253 \times 10^{-6}$  | $-0.260434 \times 10^{-7}$ | $0.651048 \times 10^{-9}$ |
| 14 | 1 | $-0.206766 \times 10^{-3}$ | $-0.206420 \times 10^{-5}$ | $-0.193787 \times 10^{-6}$ | $0.193162 \times 10^{-8}$ |
| 15 | 1 | $-0.722313 \times 10^{-4}$ | $-0.435814 \times 10^{-6}$ | $-0.319614 \times 10^{-6}$ | $0.594735 \times 10^{-8}$ |
| 17 | 1 | $-0.191528 \times 10^{-3}$ | $0.550975 \times 10^{-6}$  | $-0.255497 \times 10^{-7}$ | $0.149390 \times 10^{-8}$ |
| 24 | 1 | $0.267115 \times 10^{-3}$  | $-0.170007 \times 10^{-4}$ | $0.207709 \times 10^{-5}$  | $-0.508513 \times 10^{-7}$ |
| 25 | 1 | $0.230504 \times 10^{-3}$  | $-0.939236 \times 10^{-5}$ | $0.862202 \times 10^{-6}$  | $0.000000$ |

Figure 6:
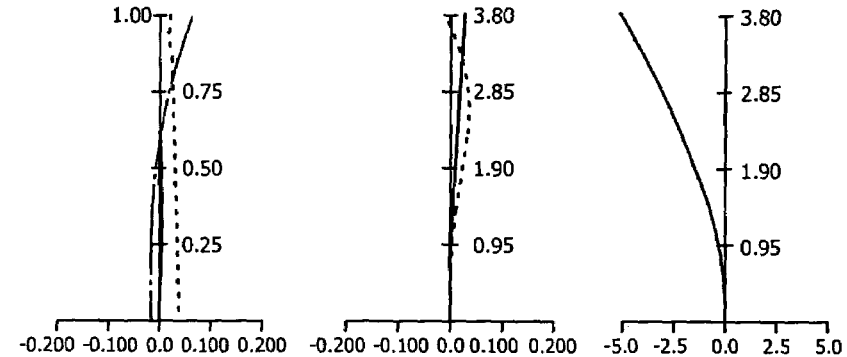
FIG. 6 graphically shows spherical aberrations, astigmatisms, and a distortion occurring with groups of lenses moved to their wide-angle positions in a second embodiment of a zoom lens in accordance with the present invention.

FIG. 6 graphically shows aberrations, which occur with the groups of lenses moved to their wide-angle positions, on the basis of the second numerical example.

Figure 7:
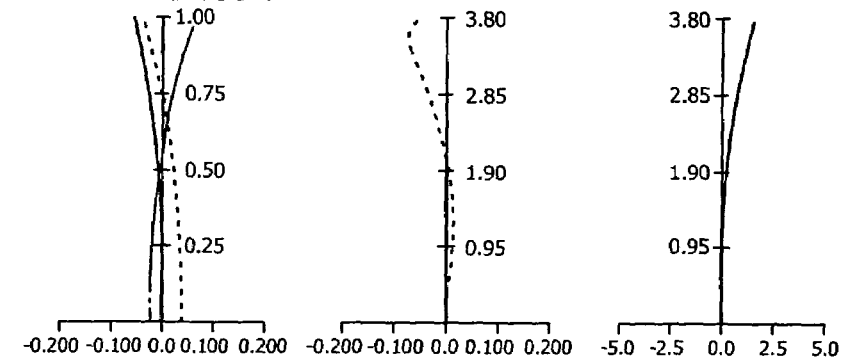
FIG. 7 graphically shows spherical aberrations, astigmatisms, and a distortion occurring with the groups of lenses moved to their intermediate focal points between their wide-angle positions and their telephoto positions in a second embodiment of a zoom lens in accordance with the present invention.

FIG. 7 graphically shows aberrations, which occur with the groups of lenses moved to their intermediate focal points between their wide-angle positions and their telephoto positions, on the basis of the second numerical example.

Figure 8:
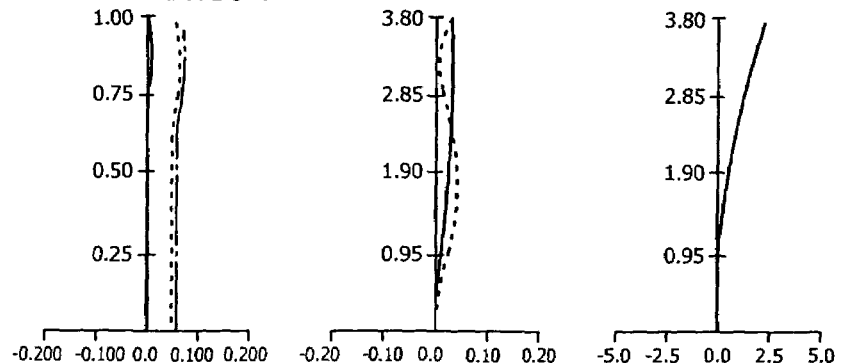
FIG. 8 graphically shows spherical aberrations, astigmatisms, and a distortion occurring with the groups of lenses moved to their telephoto positions in a second embodiment of a zoom lens in accordance with the present invention.

FIG. 8 graphically shows aberrations, which occur with the groups of lenses moved to their telephoto positions, on the basis of the second numerical example.

In the drawings graphically showing aberrations, spherical aberrations dependent on spectral lines d, C, and g are indicated with a solid line, a dashed line, and a dot-dash line respectively with the axis of ordinates graduated in ratios to f-numbers measured with the aperture stop left open and with the axis of abscissas graduated in degrees of defocus. Astigmatisms occurring on a sagittal plane and meridional plane respectively are indicated with a solid line and a dashed line respectively with the axis of ordinate graduated in image heights and with the axis of abscissas graduated in focal lengths. A distortion is indicated with the axis of ordinates graduated in image heights and the axis of abscissas graduated in percentages.

FIG. 9 shows the arrangement of lenses included in a zoom lens in accordance with a third embodiment of the present invention. According to the third embodiment, the zoom lens has a first group of lenses GR1 which is positively refractive, a second group of lenses GR2 which is negatively refractive, a third group of lenses GR3 which is positively refractive, a fourth group of lenses GR4 which is positively refractive, and a fifth group of lenses GR5 which is negatively refractive juxtaposed in that order from the end of an object space. The first group of lenses GR1 includes a negative lens G1, a rectangular prism G2 that bends the optical axis of the zoom lens 90°, and a positive lens G3 whose surfaces are aspheric surfaces. The second group of lenses GR2 includes a negative lens G4 and a compound lens made up of a negative lens G5 and a positive lens G6. The third group of lenses GR3 is realized with a positive lens G7 whose surfaces are aspheric surfaces. The fourth group of lenses GR4 is realized with a compound lens made up of a positive lens G8 and a negative lens G9. The fifth group of lenses GR5 includes a front group of lenses FG realized with a negative lens G10 and a rear group of lenses RG realized with a positive lens G11 whose object space side has an aspheric surface. The positive lens G11 realizing the rear group of lenses RG (group of blur compensation lenses) is moved in directions perpendicular to the optical axis in order to shift an image.

Moreover, the first group of lenses GR1, the third group of lenses GR3, and the fifth group of lenses GR5 are held stationary during variation of the power of the zoom lens. The second group of lenses GR is mainly moved in optical-axis directions in order to vary the power of the zoom lens. The fourth group of lenses GR4 is moved in the optical-axis directions in order to compensate a displacement of an image plane occurring during variation of the power of the zoom lens or to focus the zoom lens for near-distance imaging.

In FIG. 9, LPF denotes a low-pass filter interposed between the fifth group of lenses GR5 and the image plane IMG. Moreover, an aperture stop IR is disposed near the image-plane side of the third group of lenses GR3 and is held stationary during variation of the power of the zoom lens.

Table 7 lists as part of a third numerical example numerical values concerning optical elements that are concrete values adapted to the third embodiment.

TABLE 7

| si | ri | di | Ni | vi |
|---|---|---|---|---|
| 1 | r1 = 30.837 | d1 = 0.650 | n1 = 1.92286 | v1 = 20.884 |
| 2 | R2 = 8.011 | d2 = 1.550 | | |
| 3 | r3 = INFINITY | d3 = 7.000 | n2 = 1.88300 | v2 = 40.805 |
| 4 | r4 = INFINITY | d4 = 0.200 | | |
| 5 | r5 = 11.561(ASP) | d5 = 1.970 | n3 = 1.76802 | v3 = 49.300 |
| 6 | r6 = −23.393(ASP) | d6 = variable | | |
| 7 | r7 = 32.986 | d7 = 0.500 | n4 = 1.88300 | v4 = 40.805 |
| 8 | r8 = 6.282 | d8 = 0.965 | | |
| 9 | r9 = −12.547 | d9 = 0.500 | n5 = 1.80420 | v5 = 46.503 |
| 10 | r10 = 7.488 | d10 = 1.052 | n6 = 1.92286 | v6 = 20.884 |
| 11 | r11 = 30.403 | d11 = variable | | |
| 12 | r12 = 11.113(ASP) | d12 = 1.536 | n7 = 1.69350 | v7 = 53.201 |
| 13 | r13 = −22.861(ASP) | d13 = 0.960 | | |
| 14 | r14 = INFINITY | d14 = variable | | Aperture stop |
| 15 | r15 = 10.041(ASP) | d15 = 2.148 | n8 = 1.58313 | v8 = 59.461 |
| 16 | r16 = −5.654 | d16 = 0.500 | n9 = 1.80610 | v9 = 33.269 |
| 17 | r17 = −10.859 | d17 = variable | | |
| 18 | r18 = −14.670 | d18 = 0.500 | n10 = 1.84666 | v10 = 23.785 |
| 19 | r19 = 8.802 | d19 = 1.230 | | |
| 20 | r20 = 19.423(ASP) | d20 = 2.056 | n11 = 1.48749 | v11 = 70.441 |

TABLE 7-continued

| si | ri | di | Ni | vi |
|---|---|---|---|---|
| 21 | r21 = −7.984 | d21 = 5.346 | | |
| 22 | r22 = INFINITY | d22 = 1.600 | n12 = 1.51680 | v12 = 64.198 |
| 23 | r23 = INFINITY | d23 = 1.065 | | |
| 24 | r24 = INFINITY | d24 = 0.500 | n13 = 1.51680 | v13 = 64.198 |
| 25 | r25 = INFINITY | | | |

According to the third embodiment, the inter-surface spacing d6 between the first group of lenses GR1 and the second group of lenses GR2, the inter-surface spacing d11 between the second group of lenses GR2 and the third group of lenses GR3, the inter-surface spacing d14 between the aperture stop IR and the fourth group of lenses GR4, and the inter-surface spacing d17 between the fourth group of lenses GR4 and the fifth group of lenses GR5 are variable for the variation of the power of the zoom lens. Table 8 lists as part of the third numerical example the values of the inter-surface spacings d6, d11, d14, and d17 together with focal lengths, f-numbers, and half angles of view ω, wherein the values of the inter-surface spacings are measured with the groups of lenses moved to their wide-angle positions, their intermediate focal points between their wide-angle positions and their telephoto positions, and their telephoto positions.

TABLE 8

| Focal length | 6.00 | 10.08 | 17.07 |
|---|---|---|---|
| f-number | 3.60 | 3.83 | 4.53 |
| ω (degree) | 32.63 | 12.65 | 6.02 |
| d6 | 0.500 | 4.129 | 6.460 |
| d11 | 6.577 | 2.948 | 0.617 |
| d14 | 7.063 | 4.585 | 1.723 |
| d17 | 1.905 | 4.383 | 7.245 |

According to the third embodiment, the surfaces s5 and s6 of the second lens G3 included in the first group of lenses GR1, the surfaces s12 and s13 of the positive lens G7 serving as the third group of lenses GR3, the object space-side surface s15 of the compound lens realizing the fourth group of lenses GR4, and the object space-side surface s20 of the positive lens G11 realizing the rear group of lenses RG belonging to the fifth group of lenses GR5 are aspheric surfaces. Table 9 lists as part of the third numerical example the fourth-order, sixth-order, eighth-order, and tenth-order aspherical coefficients for the surfaces s5, s6, s12, s13, s15, and s20 together with conical constants ϵ.

TABLE 9

| si | ϵ | $A^4$ | $A^6$ | $A^8$ | $A^{10}$ |
|---|---|---|---|---|---|
| 5 | 1 | $-0.162579 \times 10^{-3}$ | $0.318636 \times 10^{-5}$ | $-0.306247 \times 10^{-6}$ | $0.371663 \times 10^{-8}$ |
| 6 | 1 | $-0.110817 \times 10^{-3}$ | $0.482533 \times 10^{-5}$ | $-0.383529 \times 10^{-6}$ | $0.647354 \times 10^{-8}$ |
| 12 | 1 | $-0.292500 \times 10^{-3}$ | $-0.870118 \times 10^{-5}$ | $0.928783 \times 10^{-6}$ | $-0.100594 \times 10^{-6}$ |
| 13 | 1 | $-0.981859 \times 10^{-4}$ | $-0.151000 \times 10^{-5}$ | $-0.251768 \times 10^{-6}$ | $-0.364700 \times 10^{-7}$ |
| 15 | 1 | $-0.252821 \times 10^{-3}$ | $0.416680 \times 10^{-5}$ | $-0.210669 \times 10^{-6}$ | $0.134125 \times 10^{-7}$ |
| 20 | 1 | $-0.336855 \times 10^{-3}$ | $-0.254551 \times 10^{-6}$ | $0.324333 \times 10^{-6}$ | 0.000000 |

Figure 10:
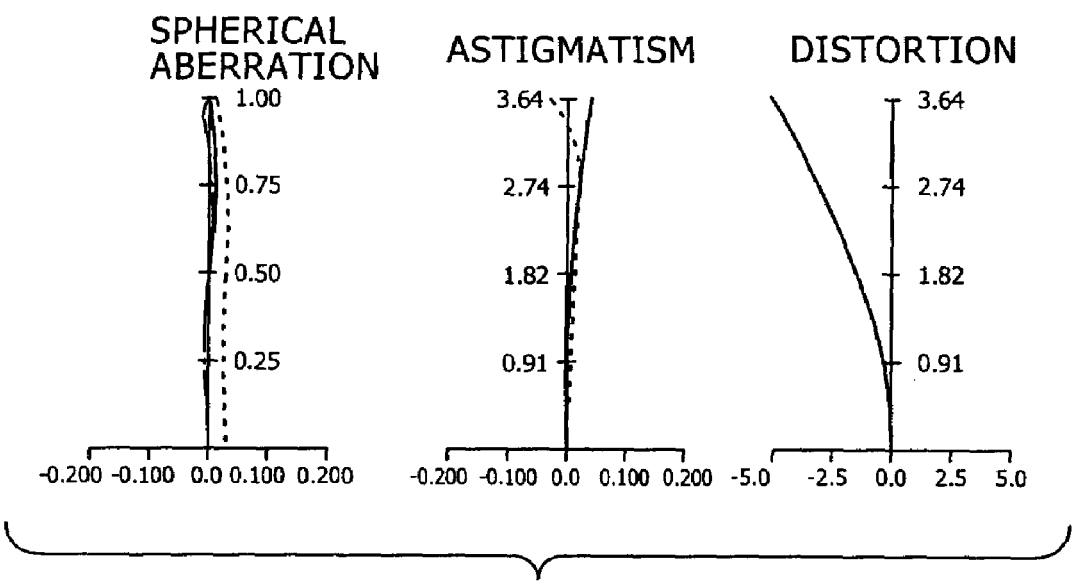
FIG. 10 graphically shows spherical aberrations, astigmatisms, and a distortion occurring with groups of lenses moved to their wide-angle positions in a third embodiment of a zoom lens in accordance with the present invention.

FIG. 10 graphically shows aberrations, which occur with the groups of lenses moved to their wide-angle positions, on the basis of the third numerical example.

Figure 11:
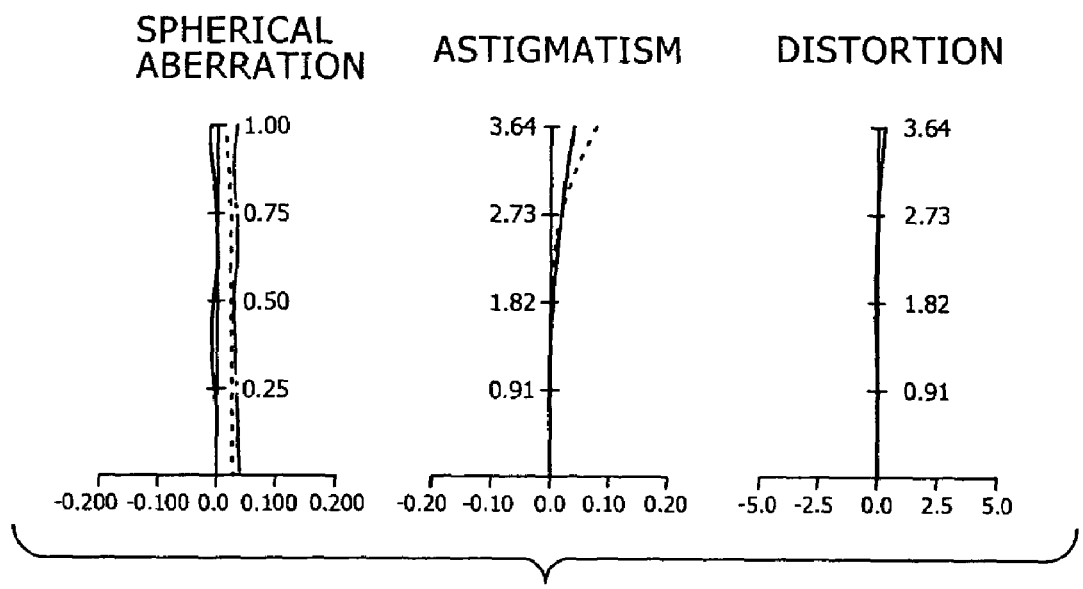
FIG. 11 graphically shows spherical aberrations, astigmatisms, and a distortion occurring with the groups of lenses moved to their intermediate focal points between their wide-angle positions and their telephoto positions in a third embodiment of a zoom lens in accordance with the present invention.

FIG. 11 graphically shows aberrations, which occur with the groups of lenses moved to their intermediate focal points between their wide-angle positions and their telephoto positions, on the basis of the third numerical example.

Figure 12:
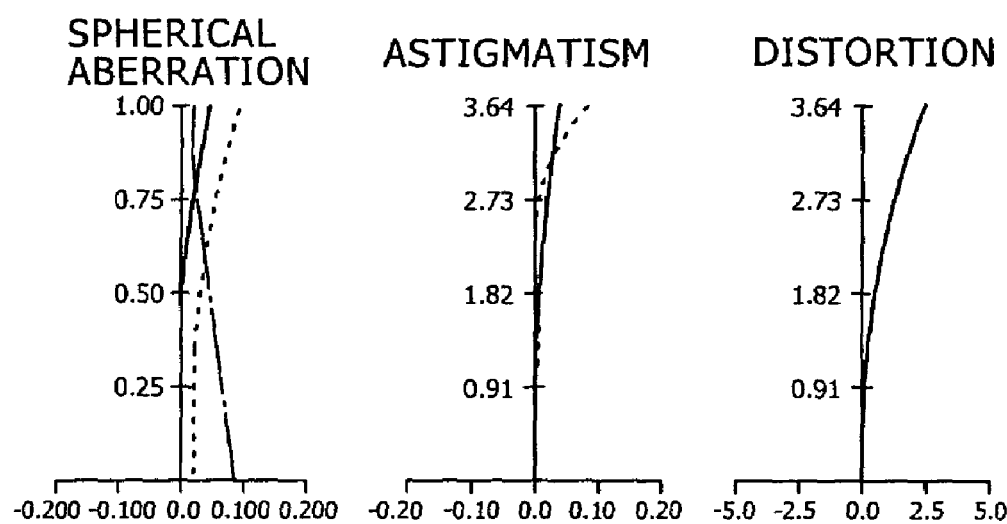
FIG. 12 graphically shows spherical aberrations, astigmatisms, and a distortion occurring with the groups of lenses moved to their telephoto positions in a third embodiment of a zoom lens in accordance with the present invention.

FIG. 12 graphically shows aberrations, which occur with the groups of lenses moved to their telephoto positions, on the basis of the third numerical example.

In the drawings graphically showing aberrations, spherical aberrations dependent on spectral lines d, C, and g are indicated with a solid line, a dashed line, and a dot-dash line respectively with the axis of ordinates graduated in ratios to f-numbers measured with the aperture stop left open and with the axis of abscissas graduated in degrees of defocus. Astigmatisms occurring on a sagittal plane and a meridional plane respectively are indicated with a solid line and a dashed line respectively with the axis of ordinates graduated in image heights and the axis of abscissas graduated in focal lengths. A distortion is indicated with the axis of ordinates graduated in image heights and the axis of abscissas graduated in percentages.

Table 10 lists the numerical values of the conditional expressions included in the formulae (1) and (2) that are calculated based on the first to third numerical examples.

TABLE 10

| Conditional expression | First numerical example | Second numerical example | Third numerical example |
| --- | --- | --- | --- |
| (1)(1/CR)Ymax | 0.027 | 0.020 | 0.014 |
| (2)(1 − βa) × βb | 0.660 | 0.782 | 0.766 |

As apparent from Table 10, the zoom lenses characterized by the first to third numerical examples satisfy the conditions expressed by the formulae (1) and (2). Moreover, as seen from the drawings graphically showing aberrations, the aberrations occurring with the groups of lenses moved to their wide-angle positions, their intermediate focal points between their wide-angle positions and their telephoto positions, and their telephoto positions are compensated in a balanced manner.

Figure 13:
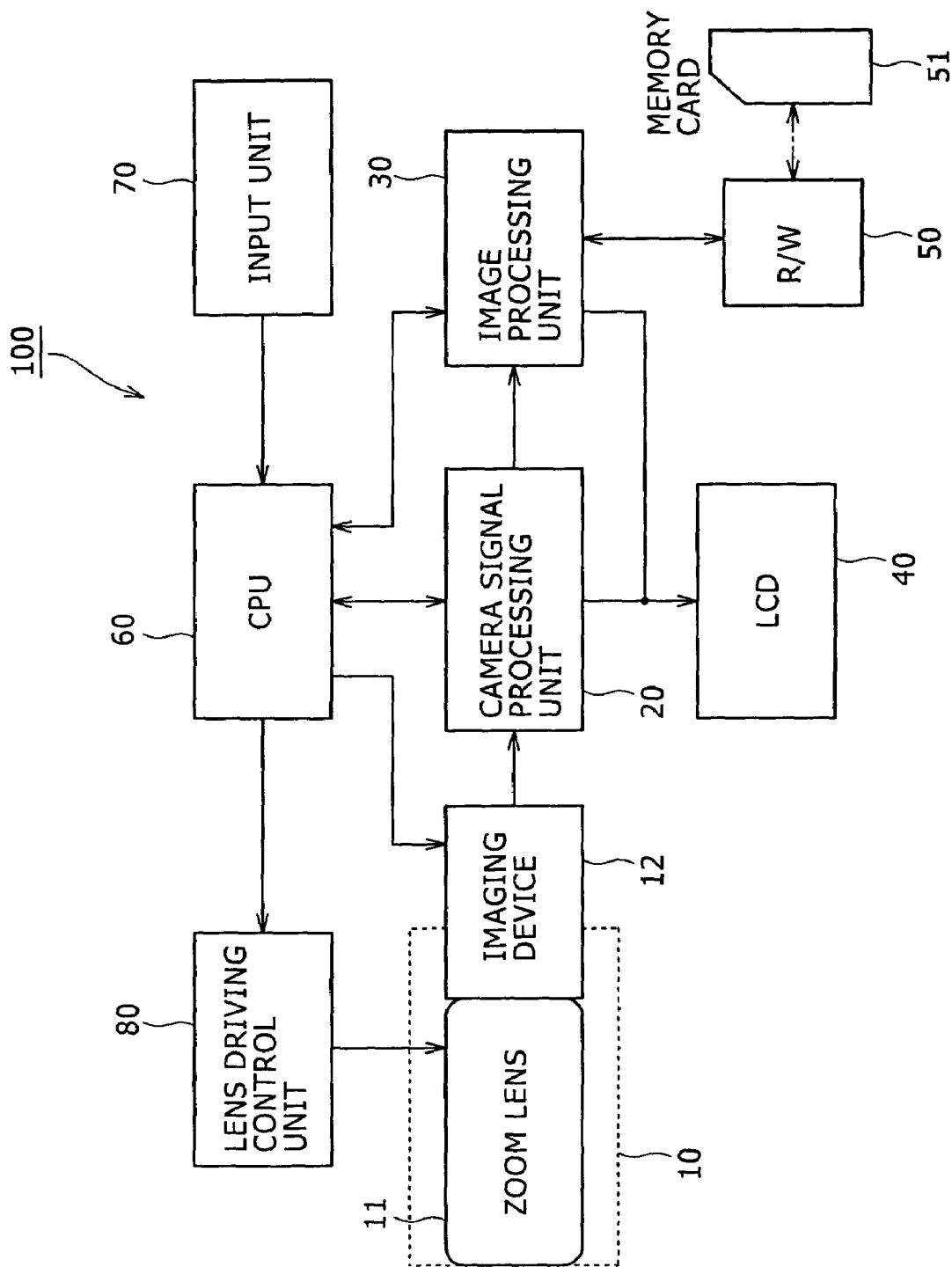
FIG. 13 is a block diagram showing the configuration of the imaging apparatus in an embodiment of an imaging apparatus in accordance with the present invention.

Next, an example of an imaging apparatus including the zoom lens will be described below. FIG. 13 is a block diagram showing an example of the configuration of a digital still camera in which the zoom lens in accordance with the present invention may be incorporated.

A digital still camera 100 shown in FIG. 13 includes a camera block 10 responsible for imaging, a camera signal processing unit 20 that performs analog-to-digital conversion and other pieces of signal processing on a produced image signal, an image processing unit 30 that records or reproduces the image signal, a liquid-crystal display (LCD) 40 that displays a constructed image or the like, a reader writer 50 that reads or writes data from or in a memory card 51, a central processing unit (CPU) 60 that controls the whole of the apparatus, an input unit 70 that a user manipulates to enter data, and a lens driving control unit 80 that controls driving of lenses included in the camera block 10.

The lens driving control unit 80 has a camera-shake compensation mechanism including a detecting system that detects the direction and the magnitude of an unexpected vibration of a camera occurring at the time of depressing a shutter release button, that is, the direction and the magnitude of a so-called camera shake, and a driving system that moves a group of blur compensation lenses in a direction, which is perpendicular to the optical axis of the camera block and which permits cancellation of a blur in an image derived from a camera shake, by a magnitude permitting cancellation of the blur.

The camera block 10 includes an optical system having a zoom lens 11 in which the present invention is implemented (a zoom lens in accordance with any of the embodiments and the first to third numerical examples) and an imaging device 12 such as a charge-coupled device (CCD). The camera signal processing unit 20 performs pieces of signal processing, such as analog-to-digital conversion of an output signal of the imaging device 12, noise cancellation, image-quality correction, and conversion of a composite video signal into luminance and chrominance signals. The image processing unit 30 performs compression and decompression as encoding and decoding on an image signal according to a predetermined image data format and performs data translation on a resolution or the like.

The memory card 51 is realized with a semiconductor memory that can be mounted or dismounted. The reader writer 50 writes image data, which is encoded by the image processing unit 30, in the memory card 51, or reads image data recorded in the memory card 51. The CPU 60 is a control processor that controls the circuit blocks included in the digital still camera according to an instruction signal received from the input unit 70.

The input unit 70 includes, for example, a shutter release button to be used to move a shutter, a selection switch to be used to select an operation mode, and others. The input unit 70 transmits an instruction signal, which is produced responsively to a user's manipulation, to the CPU 60. The lens driving control unit 80 controls a motor or the like, which is not shown but drives the lenses included in the zoom lens 11, according to a control signal sent from the CPU 60.

Hereinafter, actions to be performed in the digital still camera will be outlined.

When the digital still camera stands by for imaging, an image signal produced by the camera block 10 is transferred to the LCD 40 via the camera signal processing unit 20 under the control of the CPU 60. A camera through image is displayed according to the image signal. When an instruction signal signifying that zooming should be performed is received from the input unit 70, the CPU 60 transmits a control signal to the lens driving control unit 80. Predetermined lenses included in the zoom lens 11 are moved under the control of the lens driving control unit 80.

When the shutter that is not shown but included in the camera block 10 is opened and closed responsively to an instruction signal received from the input unit 70 (at this time, the camera-shake compensation mechanism is actuated to compensate an image shift caused by a camera shake), a produced image signal is transferred from the camera signal processing unit 20 to the image processing unit 30, then compressed to be thus encoded, and converted into digital data in compliance with a predetermined data format. The resultant data are transferred to the reader writer 50 and then written in the memory card 51.

For example, when the shutter release button is depressed halfway or held down for the purpose of recording, the lens driving control unit 80 moves predetermined lenses, which are included in the zoom lens 11, according to a control signal sent from the CPU 60. Thus, focusing is achieved.

Moreover, when image data recorded in the memory card 51 should be reproduced, the reader writer 50 reads the predetermined image data from the memory card 51 responsively to a manipulation performed on the input unit 70.

After the image processing unit 30 decompresses the image data to thus decode the image data, the reproduced image signal is transferred to the LCD 40. Consequently, a reconstructed image is displayed.

Figure 14:
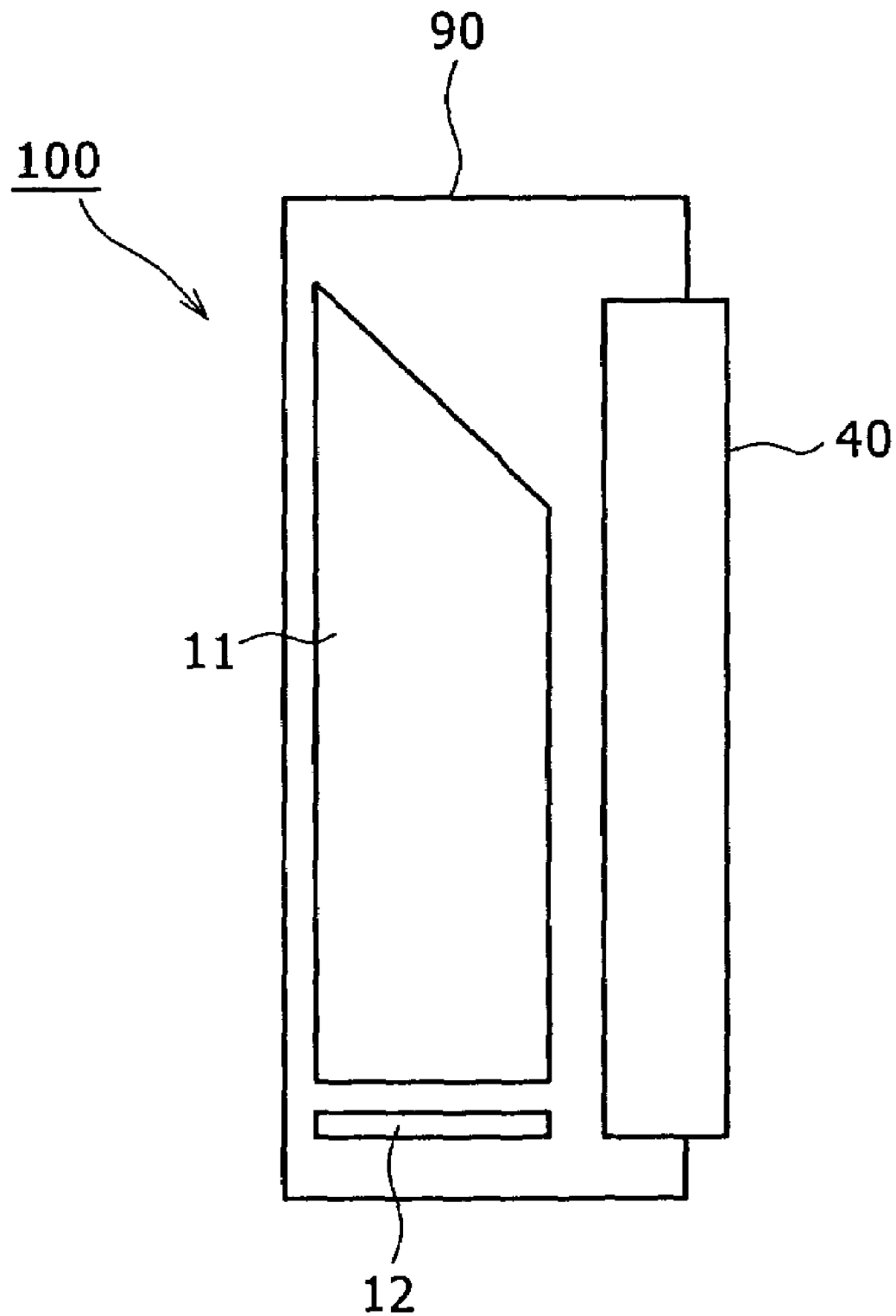
FIG. 14 shows an example of disposition of components in a camera housing in an embodiment of an imaging apparatus in accordance with the present invention.

FIG. 14 shows the inside of the digital still camera on the assumption that an object lies on the left side of the drawing. The zoom lens 11 is stored in a camera housing 90, and the imaging device 12 is located below the zoom lens 11. Moreover, the LCD 40 is mounted on the side of the camera housing 90 opposite to the side thereof facing the object and is used to match an angle of view with the object to be imaged.

A zoom lens in accordance with the embodiment of the present invention achieves zooming or focusing by angling the ray axis of light, which is reflected from an object, using a prism and then moving predetermined lenses in a direction in which the ray axis is angled (vertical direction in the drawing). This obviates the necessity of thrusting the zoom lens 11 out of the camera housing 90 for the purpose of imaging and leads to a reduction in the depth of a camera body during imaging. In addition, if the zoom lens 11 is designed to satisfy the aforesaid conditions, the camera housing 90 can be designed more thinly and vertically compactly. Despite the compact design, triple, quadruple, or quintuple zooming can be achieved. Moreover, a camera shake is compensated. Eventually, a high-quality image little affected by aberrations can be constructed with a focal length set to any value.

The embodiments have been described on the assumption that the present invention is adapted to a digital still camera. The present invention may be adapted to other imaging apparatuses such as a video camera.

The shapes and structures of the components of each of the aforesaid embodiments and the numerical values presented as each of the numerical examples are mere examples to be referenced in implementing the present invention, and they are not intended to restrict the technological scope of the present invention.

The present invention is preferably adapted to a compact imaging apparatus that is relatively compact and likely to cause a camera shake at the time of pressing a shutter release button, such as, a digital still camera or a digital video camera.

It should be understood by those skilled in the art that various modifications, combinations, subcombinations and alterations may occur depending on design requirements and other factors insofar as they are within the scope of the appended claims or the equivalents thereof.

What is claimed is:

1. A zoom lens comprising:
a plurality of groups of lenses and varying the power thereof by changing inter-group spacings,
wherein:
the last group of lenses that is located at the end of an image space and is negatively refractive is held stationary in optical-axis directions during variation of the power of the zoom lens, and includes a front group of negative lenses and a rear group of positive lenses;
the rear group of positive lenses or part of the rear group of positive lenses (hereinafter, referred to as a group of blur compensation lenses) is movable in directions orthogonal to the optical axis of the zoom lens; and
the group of blur compensation lenses is moved in the directions orthogonal to the optical axis in order to shift an image, and
wherein the condition expressed by the following formula (1) is satisfied:

$$0.02 < (1/CR)/Y\max < 0.05 \quad (1)$$

where CR denotes a radius of curvature whose reciprocal is a curvature of a surface of a lens located at an object space-side end of the group of blur compensation lenses, and Ymax denotes a maximum height of an image converged on an imaging device.

2. The zoom lens according to claim 1, wherein:
a group of lenses located at the end of an object space is held stationary in the optical-axis directions during variation of the power of the zoom lens; and
a reflecting member is included for bending the optical axis of the zoom lens substantially 90°.

3. The zoom lens according to claim 1, wherein:
a first group of lenses that is positively refractive, a second group of lenses that is negatively refractive, a third group of lenses that is positively refractive, a fourth group of lenses that is positively refractive, and a fifth group of lenses that is negatively refractive are juxtaposed in that order from the end of an object space; and
the fourth group of lenses is moved in the optical-axis directions in order to focus the zoom lens for near-distance imaging.

4. The zoom lens according to claim 1, wherein the condition expressed by the following formula (2) is satisfied:

$$0.5 < (1-\beta a) \times \beta b < 1.2 \quad (2)$$

wherein $\beta a$ denotes a power offered by the group of blur compensation lenses, and $\beta b$ denotes a power offered by a group of lenses located more closely to an image plane than the group of blur compensation lenses.

5. An imaging apparatus comprising:
a zoom lens that includes a plurality of groups of lenses and varies the power thereof by changing an inter-group spacing, and an imaging device that converts an optical image formed by the zoom lens into an electrical signal,
wherein:
the zoom lens has the last group of lenses, which is located at the end of an image space and is negatively refractive, held stationary in optical-axis directions during variation of the power of the zoom lens and composed of a front group of negative lenses and a rear group of positive lenses;
the rear group of positive lenses or part of the rear group of positive lenses (hereinafter, referred to as a group of blur compensation lenses) is movable in directions orthogonal to the optical axis of the zoom lens; and
the group of blur compensation lenses is moved in the directions orthogonal to the optical axis in order to shift an image, and
wherein the zoom lens satisfies the condition expressed by the following formula (1):

$$0.02 < (1/CR)/Y\max < 0.05 \quad (1)$$

where CR denotes a radius of curvature whose reciprocal is a curvature of a surface of a lens located at an object space-side end of the group of blur compensation lenses, and Ymax denotes a maximum height of an image converged on an imaging device.

6. The imaging apparatus according to claim 5, wherein a group of lenses included in the zoom lens and located at the end of an object space is held stationary in the optical-axis directions during variation of the power of the zoom lens, and a reflecting member is included for bending the optical axis of the zoom lens substantially 90°.

7. The imaging apparatus according to claim 5, wherein:
the zoom lens has a first group of lenses which is positively refractive, a second group of lenses which is negatively refractive, a third group of lenses which is positively refractive, a fourth group of lenses which is positively refractive, and a fifth group of lenses which is negatively refractive juxtaposed in that order from the end of an object space; and
the fourth group of lenses is moved in the optical-axis directions in order to focus the zoom lens for near-distance imaging.

8. The imaging apparatus according to claim 5, wherein the zoom lens satisfies the condition expressed by the following formula (2):

$$0.5 < (1-\beta a) \times \beta b < 1.2 \qquad (2)$$

where $\beta a$ denotes a power offered by the group of blur compensation lenses, and $\beta b$ denotes a power offered by a group of lenses located more closely to an image plane than the group of blur compensation lenses.

9. A zoom lens comprising: a first group of lenses that is positively refractive; a second group of lenses that is negatively refractive; a third group of lenses that is positively refractive, said third group of lenses being stationary in an optical-axis direction during a variation of a zoom lens power; a fourth group of lenses that is positively refractive, said fourth group of lenses being moveable in said optical-axis direction during said variation of the zoom lens power; and a fifth group of lenses that is negatively refractive, said fifth group of lenses being stationary in said optical-axis direction during said variation of the zoom lens power; wherein the condition expressed by the following formula (1) is satisfied:

$$0.02 < (1/CR)/Y\max < 0.05 \qquad (1)$$

where CR denotes a radius of curvature whose reciprocal is a curvature of a surface of a lens located at an object space-side end of the group of blur compensation lenses, and Ymax denotes a maximum height of an image converged on an imaging device.

10. The zoom lens according to claim 9, wherein said second group of lenses being between said first group of lenses and said third group of lenses.

11. The zoom lens according to claim 9, wherein said fourth group of lenses is between said third group of lenses and said fifth group of lenses.

12. The zoom lens according to claim 9, wherein a low-pass filter is between said fifth group of lenses and an image plane.

13. The zoom lens according to claim 9, wherein an aperture stop is between said third group of lenses and said fourth group of lenses.

14. The zoom lens according to claim 13, wherein said aperture stop is stationary during said variation of the zoom lens power.

15. The zoom lens according to claim 9, wherein said fifth group of lenses is located at an end of an image space.

16. The zoom lens according to claim 9, wherein said fifth group of lenses includes a front group of negative lenses and a rear group of positive lenses.

17. The zoom lens according to claim 16, wherein a group of blur compensation lenses is said rear group of positive lenses or part of said rear group of positive lenses.

18. The zoom lens according to claim 17, wherein said group of blur compensation lenses is movable in directions orthogonal to the optical axis of the zoom lens.

19. The zoom lens according to claim 17, wherein said group of blur compensation lenses includes a reflecting member, said reflecting member being adapted to bend an optical axis of the zoom lens substantially 90°.

20. The zoom lens according to claim 17, wherein the condition expressed by the following formula (2) is satisfied:

$$0.5 < (1-\beta a) \times \beta b < 1.2 \qquad (2)$$

wherein $\beta a$ denotes a power offered by the group of blur compensation lenses, and $\beta b$ denotes a power offered by a group of lenses located more closely to an image plane than the group of blur compensation lenses.

* * * * *

UNITED STATES PATENT AND TRADEMARK OFFICE
CERTIFICATE OF CORRECTION

PATENT NO.      : 7,312,934 B2                                           Page 1 of 1
APPLICATION NO. : 11/206265
DATED           : December 25, 2007
INVENTOR(S)     : Yoshito Iwasawa It is certified that error appears in the above-identified patent and that said Letters Patent is hereby corrected as shown below:

Column 18, Line 55:
"0.02" should read -- .002 --.

Column 19, Line 34:
"0.02" should read -- .002 --.

Signed and Sealed this

Thirtieth Day of September, 2008

JON W. DUDAS
*Director of the United States Patent and Trademark Office*